(12) United States Patent  (10) Patent No.: US 7,855,011 B2
Meschter  (45) Date of Patent: Dec. 21, 2010

(54) MONOBLOCK LITHIUM ION BATTERY

(75) Inventor: John Eric Meschter, New York, NY (US)

(73) Assignee: International Battery, Inc., Allentown, PA (US)

( * ) Notice: Subject to any disclaimer, the term of this patent is extended or adjusted under 35 U.S.C. 154(b) by 302 days.

(21) Appl. No.: 12/200,166

(22) Filed: Aug. 28, 2008

(65) Prior Publication Data

US 2010/0055556 A1 Mar. 4, 2010

(51) Int. Cl.
H01M 6/42 (2006.01)
H01M 2/02 (2006.01)
H01M 2/12 (2006.01)

(52) U.S. Cl. .................. 429/159; 429/181; 429/82; 429/160

(58) Field of Classification Search ......... 429/159–160, 429/181, 82
See application file for complete search history.

(56) References Cited

U.S. PATENT DOCUMENTS

| 4,622,274 | A | 11/1986 | Lowrance |
| 5,108,847 | A | 4/1992 | Edwards et al. |
| 5,472,802 | A | 12/1995 | Holland et al. |
| 5,773,958 | A | 6/1998 | Gow et al. |
| 5,879,831 | A | 3/1999 | Ovshinsky et al. |
| 5,910,382 | A | 6/1999 | Goodenough et al. |
| 6,007,944 | A | 12/1999 | Bechtold et al. |
| 6,255,015 | B1 | 7/2001 | Corrigan et al. |
| 6,514,640 | B1 | 2/2003 | Armand et al. |
| 6,635,380 | B1 * | 10/2003 | Shimoda et al. ............... 429/93 |
| 6,689,510 | B1 | 2/2004 | Gow et al. |
| 6,864,013 | B2 | 3/2005 | Gow et al. |
| 6,878,485 | B2 | 4/2005 | Ovshinsky et al. |
| 7,217,473 | B2 | 5/2007 | Ovshinsky et al. |
| 7,264,901 | B2 | 9/2007 | Gow et al. |
| 7,547,487 | B1 * | 6/2009 | Smith et al. .................... 429/83 |
| 2003/0162091 | A1 * | 8/2003 | Watanabe et al. ........... 429/156 |
| 2005/0191528 | A1 * | 9/2005 | Cortes et al. .................. 429/7 |
| 2007/0037053 | A1 | 2/2007 | Anantharaman |
| 2007/0212603 | A1 | 9/2007 | Nathan et al. |

FOREIGN PATENT DOCUMENTS

JP 59138054 A 8/1984

OTHER PUBLICATIONS

Universal Battery; Battery Specification Sheets for Model Nos. UB645 (6V4.5Ah) and UB12350 (12V35Ah).

* cited by examiner

Primary Examiner—Patrick Ryan
Assistant Examiner—Karie O'Neill Apicella
(74) Attorney, Agent, or Firm—Design IP

(57) ABSTRACT

The present invention describes a monoblock for a plurality of lithium ion cells. The monoblock includes a case having a base and a cover dimensioned and configured to the base. The case includes a chamber that includes cell compartments for lithium cells. Each lithium cell is disposed in a leaf spring that applies compression pressure on the cell. The structural integrity of the battery and cells is maintained using internal and external anti-swelling features including a waffle pattern, backing plates, etc. A liquid and gas pressure management system is also incorporated with the case and realized by a vent plenum, check valves, bladders, bags, etc.

8 Claims, 7 Drawing Sheets

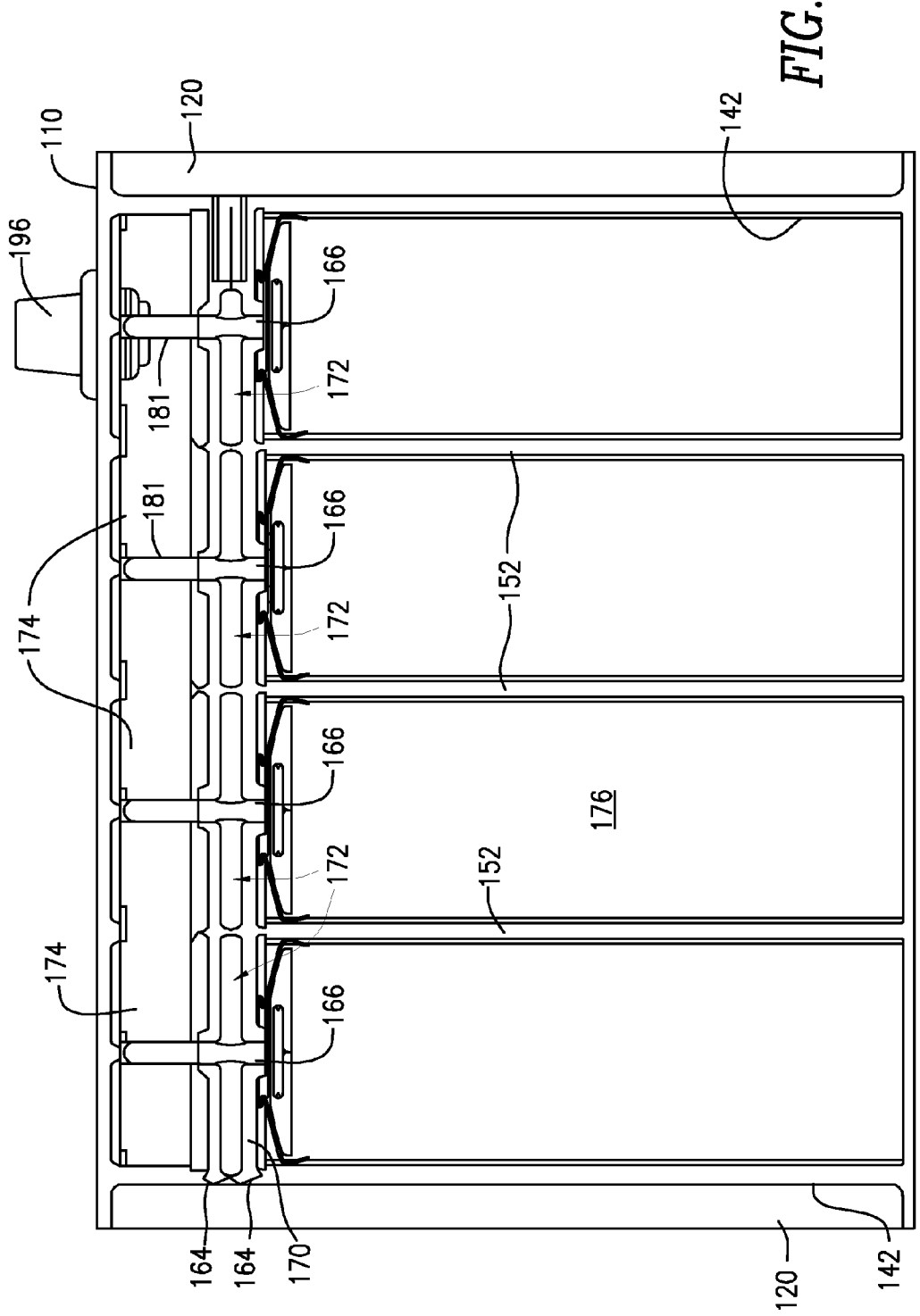

MONOBLOCK LITHIUM ION BATTERY

PRIORITY AND RELATED APPLICATION

Not applicable.

FIELD OF THE INVENTION

The present invention relates to lithium ion batteries constructed as a monoblock. More particularly, the present invention relates to containment embodiments suitable for lithium ion batteries constructed as a monoblock.

BACKGROUND OF THE INVENTION

Rechargeable batteries are used in a variety of industrial, commercial and military applications such as fork lifts, uninterruptible power supplies, electric vehicles and military weapons systems.

Rechargeable lead-acid batteries are a useful power source for starter motors for internal combustion engines. However, their low energy density (about 30 wh/kg) and their inability to perform at high temperature, makes them an impractical power source for electric vehicles (EV), hybrid electric vehicles (HEV) and other systems requiring a high energy density power source. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni-MH batteries") are far superior to lead-acid batteries, and Ni-MH batteries are currently used in electric vehicles, hybrid vehicles and other forms of vehicular propulsion. For example, Ni-MH batteries, such as those described in U.S. Pat. No. 5,277,999, the disclosure of which is hereby incorporated herein by reference, have a much higher energy density than lead-acid batteries, can power an electric vehicle over 250 miles before requiring recharge, can be recharged in 30 minutes, and contain no toxic materials.

Extensive research has been conducted in the past into improving the electrochemical aspects of the power and charge capacity of Ni-MH batteries, which is discussed in detail in U.S. Pat. Nos. 5,096,667, 5,104,617, 5,238,756 and 5,277,999, the contents of which are all hereby incorporated herein by reference.

The mechanical and thermal aspects of the performance of Ni-MH batteries have important aspects of operation. For example, in electric vehicles and in hybrid vehicles, the weight of the batteries is a significant factor. For this reason, reducing the weight of individual batteries is a significant consideration in designing batteries for electric and hybrid vehicles. Battery weight should be reduced while still affording the necessary mechanical requirements of the battery (i.e. ease of transport, ruggedness, structural integrity, etc.).

Electric vehicle and hybrid vehicle applications include a critical requirement for thermal management. Individual electrochemical cells are placed together in close proximity and many cells are electrically coupled together. Therefore, since there is an inherent tendency to generate significant heat during charge and discharge, a workable battery design for electric and hybrid vehicles is judged by whether or not the generated heat is sufficiently controlled. Sources of heat are primarily twofold. First, ambient heat due to the operation of the vehicle in hot climates; second, resistive or $I^2R$ heating known as and hereinafter referred to as "joule heating" on charge and discharge, where I represents the current flowing into or out of the battery and R is the resistance of the battery.

Batteries have been developed which reduce the overall weight thereof and incorporate the necessary thermal management needed for successful operation in electric and hybrid vehicles and other applications, without reducing its energy storage capacity or power output. One such battery design is a monoblock battery. Monoblocks are multicavity packaging embodiments in which the cavities are all contained within one enclosure. An example of a monoblock battery is provided in U.S. Pat. No. 6,255,051 issued to Corrigan et al. on Jul. 3, 2001, the contents of which are hereby incorporated herein by reference. Another example of a monoblock battery is provided in U.S. Pat. No. 6,689,510 issued to Gow et al. on Feb. 10, 2004, the contents of which are hereby incorporated herein by reference. Another example of a monoblock battery is provided in U.S. patent application Ser. No. 09/861,914, now U.S. Pat. No. 7,264,901 issued to Gow et al. on Sep. 4, 2007, the disclosure of which is hereby incorporated herein by reference.

Polymers are widely used as materials of choice in prismatic battery enclosures due to advantages including lower cost, lower weight and easier manufacturability when compared to metal enclosures. In order to ensure that such a battery fulfills life expectations it is important to transfer heat away from the battery. Although polymers typically have excellent volume resistivity and dielectric properties, poor thermal conductivity is a drawback. Currently, there exists a need in the art for battery case having a design that may be easily modified for a plurality of applications and provide effective thermal management and mechanical stability. The present invention overcomes deficiencies in the prior art by incorporating a versatile monoblock design with polymer materials having differing thermal resistivity to provide a battery having improved structural integrity, simplified assembly, maximized power volume and low internal resistance.

Known in the art are large format versions of energy storage electro-chemistries such as lead-acid and Nickel-cadmium, multi-cavity packaging embodiments enclosing more than one electrochemical energy storage cell. A number of technical problems had to be solved in order to incorporate these chemistries into a monoblock construction. These problems include, but are not limited to cell insertion, cell stack compression, cell gas and liquid pressure containment, venting, cell electrolyte filling, cell interconnects to external terminals, intraconnects between cells, case sealing and hermeticity, structural integrity of the case, anchoring of internal components against shock, vibration, charging/discharging and temperature cycling.

Solutions to the above problems have been developed that are optimized for electro-chemistries such as lead-acid and Nickel-cadmium. However, due to the differences between lead acid batteries and lithium ion batteries difficulties exist in creating a monoblock battery for lithium ion chemistries. Accordingly, the solutions for lead-acid and Nickel-cadmium monoblock batteries, are not always applicable with respect to creating monoblock lithium ion batteries.

Lithium ion based batteries face the same but more extreme problems than other battery chemistries in addition to facing unique challenges of it's own. These challenges include the need for: extremely low internal resistance; safety related to overheating, over pressurization, and combustion; space for integration of Battery Management Systems (BMS); containment and restraint of gas pressures; case hermeticity to prevent outward or inward flow of water, and degradation of electrolyte.

These challenges have curtailed the ability to realize a large format, multi-cell lithium ion monoblock battery. There is a need for a large-scale lithium ion battery in a monoblock case overcoming the difficulties cited above. Such a battery would have multiple cells in a monoblock case. It is desired that such a monoblock would be able to withstand forces generated by swelling of cell layers. It is also of interest to provide a means of compressing cell stacks. Furthermore, there is a need for monoblock case that is impermeable to the transmission of water. There is also a need for a pressure and liquid/gas management system in a lithium ion monoblock.

The present invention overcomes deficiencies in the prior art by providing solutions to problems cited above.

BRIEF SUMMARY OF THE INVENTION

The present invention describes a monoblock lithium ion battery having a base defining chambers for a plurality of cells, a first tray disposed over the base to seal the base, a second tray disposed over the first tray to form a vent plenum and a cover disposed over the second tray to provide a Battery Management System circuit chamber ("BMS chamber"). Said base receiving lithium ion cells, said vent plenum receiving gas or liquid from the base and said BMS chamber holding the Battery Management System ("BMS"). The trays have terminal openings to permit terminals of each lithium ion cell to extend from the chamber past the vent plenum into the BMS held in the BMS chamber. Leaf springs are used with each lithium ion cell to compress the cell as it is held within cell compartments within the base.

The present invention incorporates both internal and external anti-swelling features to address issues specific to lithium ion cells. Examples of internal anti-swelling features include use of pads or backing plates, while use of endplate or of honeycomb pattern in the ends of the case are suitable examples of external anti-swelling features. The case is designed to overcome prior art difficulties in preparing a monoblock lithium ion battery.

BRIEF DESCRIPTION OF THE DRAWING

FIG. 4 is a sectional view of the monoblock lithium ion battery taken along line 4-4 in FIG. 1.

DETAILED DESCRIPTION OF THE INVENTION

Figure 1:
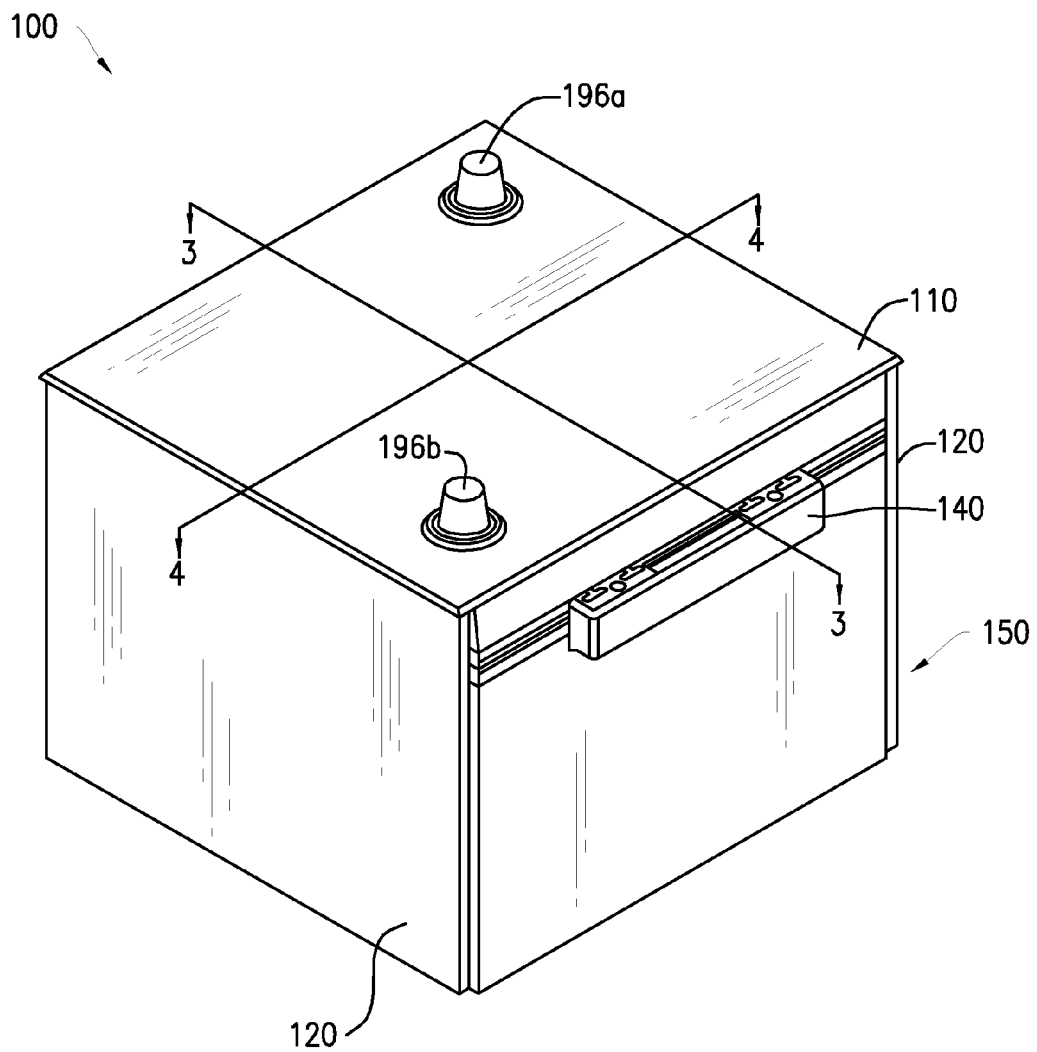
FIG. 1 is a perspective view of a monoblock lithium ion battery of the present invention.
Figure 2:
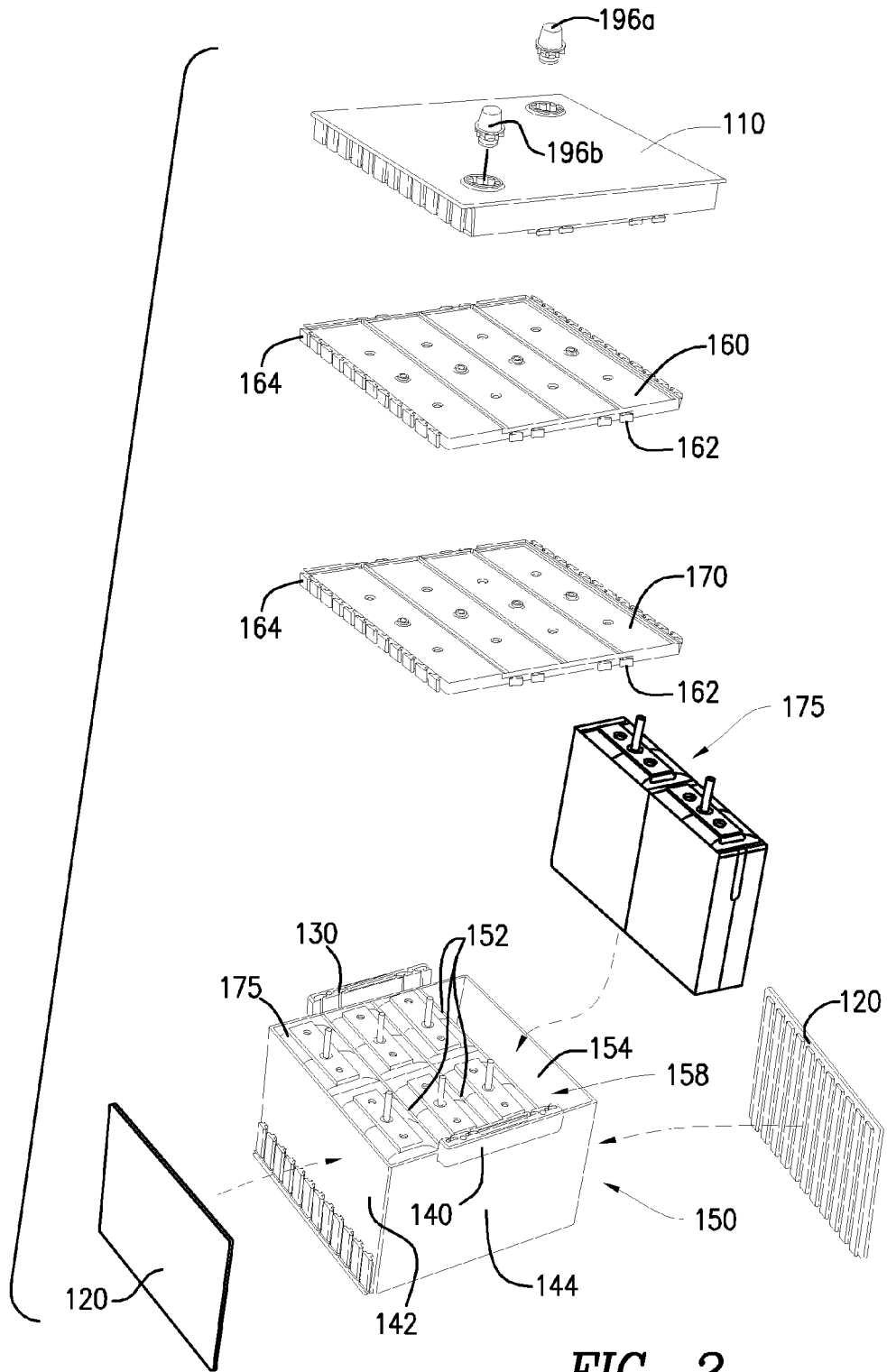
FIG. 2 is an exploded view of the monoblock lithium ion battery of FIG. 1.

FIGS. 1 and 2 show a monoblock lithium ion battery case 100 of the present invention. The case 100 includes a base 150 and a cover 110. Handles 140 are disposed on sides 144 of the base 150 and endplates 120 disposed at ends 142 of the base 150. The sides and ends of the base 150 are connected to a bottom (not shown) and define the base 150 with an open top. The bottom may be integrally molded with the sides 144 and ends 142 or joined to the case 100 through plastic welding techniques or other known methods. The cover 110 is dimensioned and configured to fit over the open top of the base 150 forming the case 100.

Referring to FIG. 2, base 150 defines chambers 158 for a plurality of cells defined by cell compartments walls 152. Four cell compartments 154 of uniform widths are shown in the figures. Generally, each cell compartment wall 152 is thin, but the wall 152 may be thicker in some embodiments. The case 100 is not limited by number or by the widths of the cell compartments 154. For instance, unlike the uniform widths of compartments 154 shown in the figures, the case 100 may be made where the width of the outermost cell compartments 154 is larger than the widths of the innermost cell compartments 154.

Said cell compartments 154 receive cells 175, which include a lithium ion cell stack 176, a backing plate 184 and a leaf spring 188. (FIGS. 4 and 5) The cells 175 are disposed in the cell compartment 154 and sit below the level of the cover 110. (FIG. 2) In certain embodiments, the height of cell compartment walls 152 of the chamber 158 are shorter than the height of sides 144 and ends 142 of the case 100.

Figure 5A:
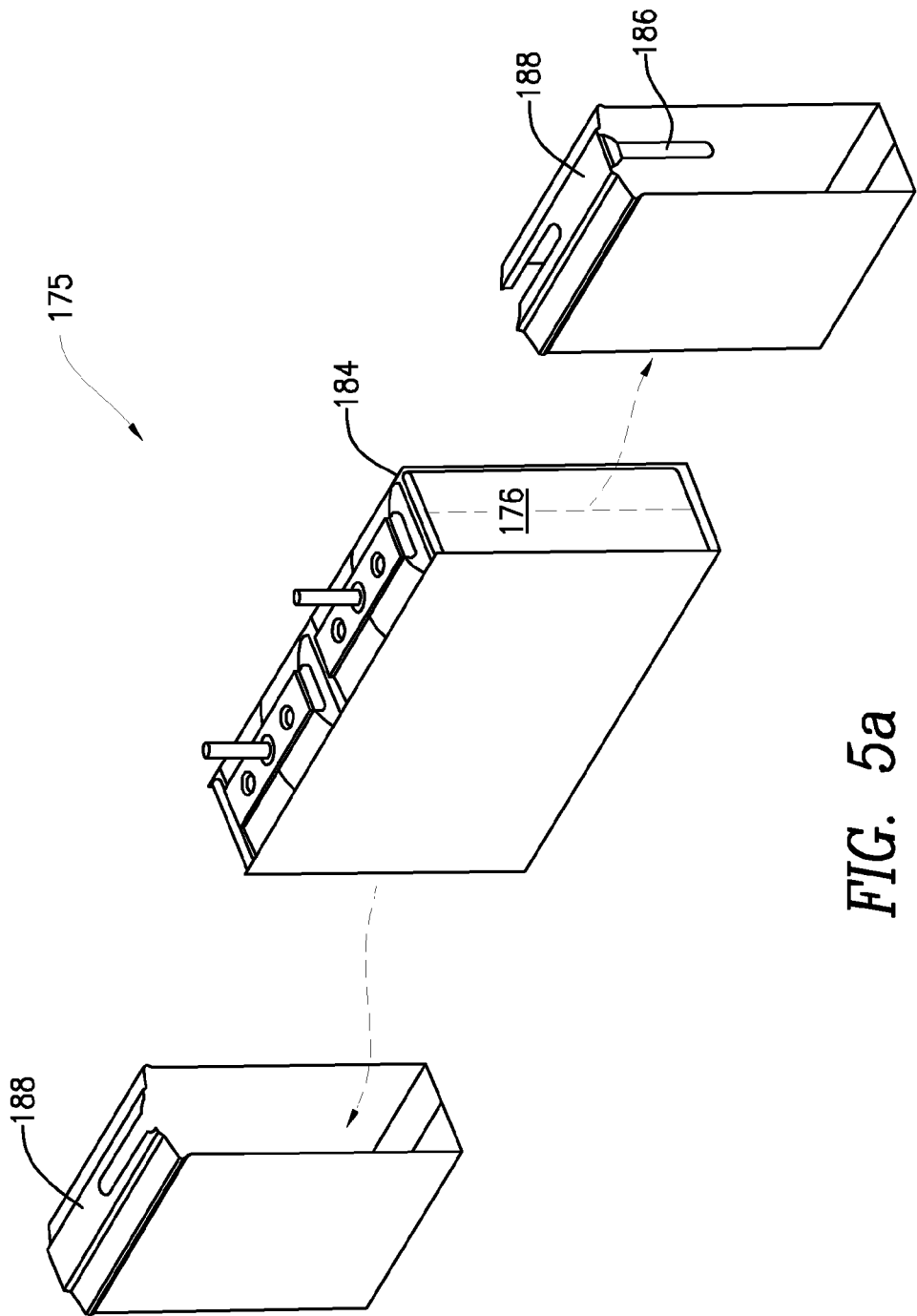
FIG. 5*a* is an exploded view of a cell wherein leaf springs are exploded from the lithium ion cell disposed in a backing plate.
Figure 5B:
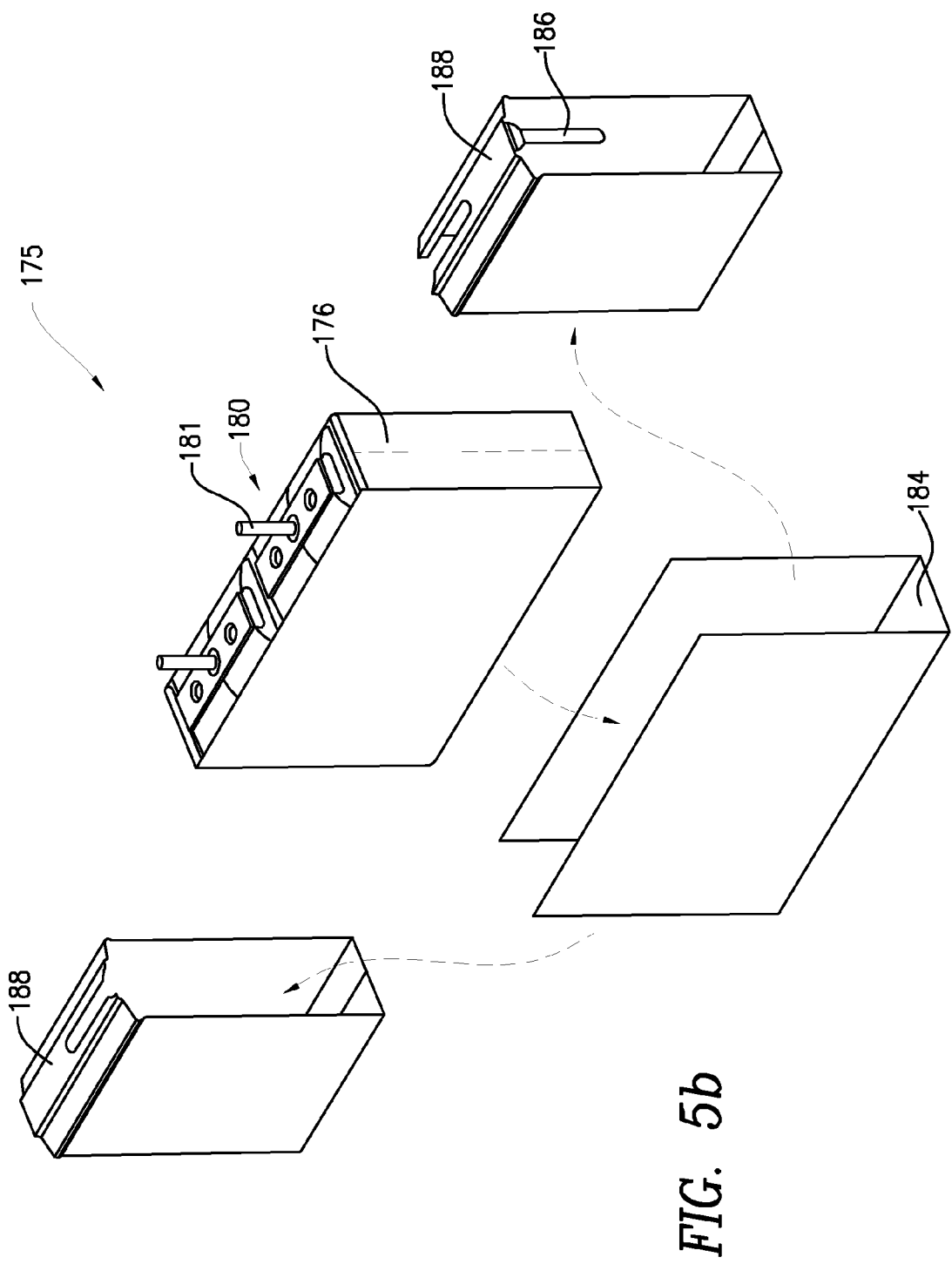
FIG. 5*b* is an exploded view of a cell showing a lithium ion cell, a backing plate and leaf springs.

FIGS. 2, 5*a* and 5*b* show cells 175 disposed in the cell compartments 154. Each lithium ion cell stack 176 has two terminals 180 with each terminal having a post 181. In an exemplary embodiment, each cell 175 provides three volts and the overall battery case 100 provides 12 volts. As shown in FIG. 5*b*, backing plates 184 electrically connects electrode leaves of the cell stack 176 together and connects the cell stack 176 to the terminals 180 and terminal posts 181. A leaf spring 188 is then disposed over the backing plate 184 and around the cell stack 176 before the cell 175 is disposed in the cell compartment 154.

Figure 6:
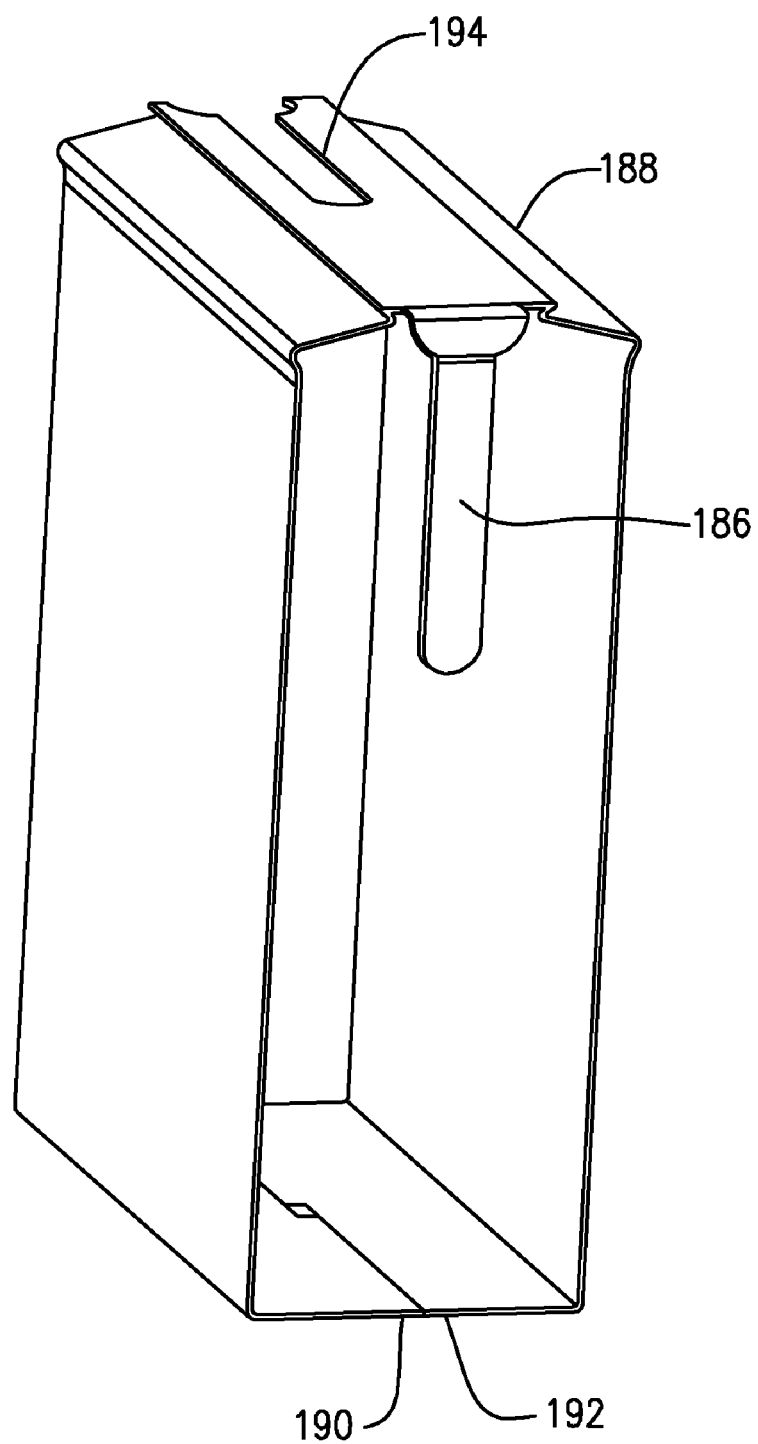
FIG. 6 is a perspective view of a battery leaf spring.

Leaf spring 188, also referred to herein as spring 188, is shown in FIGS. 5*a*, 5*b* and 6. The figures show two springs 188 used with one cell stack 176, however one spring 188 or any number of springs 188 may be employed in the present invention. The spring 188 has a central portion with a first wall and a second wall depending from the central portion. Each the first wall and the second wall have a first end 190 and a second end 192, respectively. The central portion of the spring 188 has a groove 194 dimensioned and configured to slide past the terminal post 181 and a finger 188 to help orient the spring 188 on the cell stack 176. Leaf spring 188 may be placed on the cell stack 176 or cell stack 176 and plate 184 to compress electrode leaves in a cell stack 176 so that the electrode leaves exert no net force against the cell compartment walls 152 and ends 142 of the base 150.

The spring 188 has a preformed curvature defined by each the first wall and the second wall of the spring 188. The force required to close the spring 188 and join the first end 190 and the second end 192 must overcome a spring force of the preformed curvature of each the first wall and second wall to sufficiently flatten the walls and connect the first and second ends. Thus, when the first end 190 and the second end 192 are coupled the spring 188 applies a uniform force on the cell stack 176.

The leaf spring 188 functions as a preloaded compression device by applying opposing forces to opposite sides of the cell stack 176 to reduce any future swelling of the cell 175. In addition to providing a preemptory force against swelling, the spring loading provides a means for shock protection when the battery case 100 is used in unstable or unsteady environs.

In certain embodiments, the springs 188 may be treated for protection from the electrolytes disposed in the cell compartments 154. The springs 188 may be encapsulated or laminated in polypropylene or other electrolyte-impermeable polymers, or grounded, plated, painted, coated, anodized, passivated, etc. In other embodiments, the spring 188 may also be coated with abrasion resistant treatments or coatings. While still other embodiments use a suitably corrosion resistant stainless steel.

Trays 160, 170 are shown in FIG. 2 and disposed above chamber 158 and below cover 110. Said trays 160, 170 have terminal openings 166 and vent openings 168 disposed through the trays and retaining features such as tabs 162, 164 disposed at the edges of the trays 160, 170. Tabs 162 of trays 160, 170 are dimensioned and configured to fit through slots 130 defined in handle 140. The tabs 162 lock the trays 160, 170 into the handles 140 via slots 130 and provide additional strength to case 100.

Figure 3:
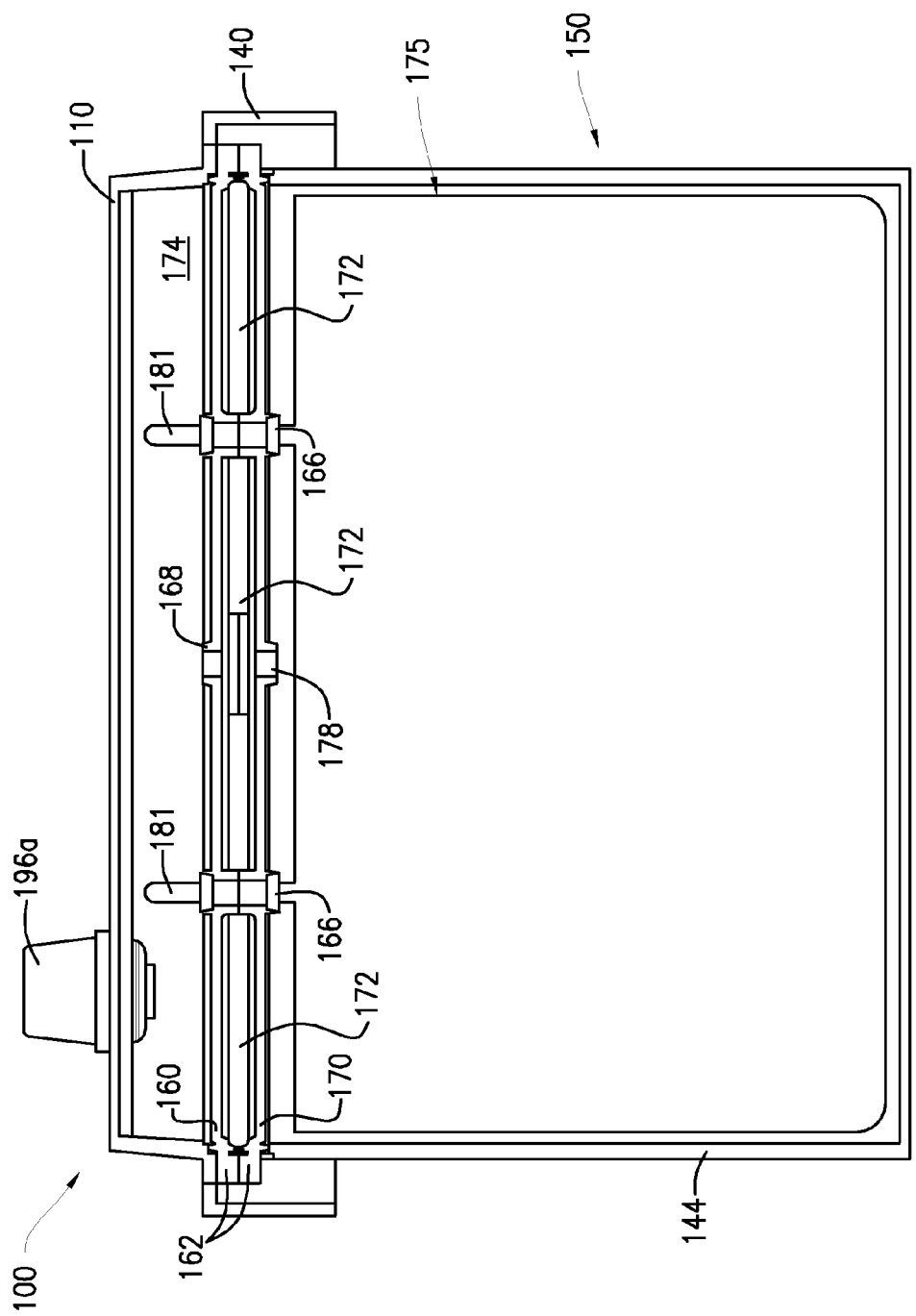
FIG. 3 is a sectional view of the monoblock lithium ion battery taken along line 3-3 in FIG. 1.

FIGS. 3 and 4 show trays 160, 170 nesting one on top the other. Tray 170 fits over chamber 158 defined within the base 150. Tray 160 is disposed over and interlocks with tray 170 to define a vent plenum 172 above the chamber 158. A check valve 178 may be disposed in each vent opening 168 and connects each cell compartment 154 to the vent plenum 172. In some embodiments, a collapsible gas reservoir or pressure/liquid/gas collapsible bladder (not shown) containing gas or electrolyte absorbing material may be interposed between said check valves 178 and the vent opening 168.

The closed battery case 100 is formed by placing the cover 110 over the base 150. Specifically, the cover 110 is disposed over tray 160 to define a battery management system (BMS) chamber 174, also called a second chamber. The BMS chamber 174 is disposed above the vent plenum 172 and accommodates an integral and inseparable battery management system (BMS) not shown in the figures. In an alternate embodiment, the BMS chamber 174 could be disposed vertically between cell compartments 154, for instance between the two innermost cells compartments 154 in the case 100. Battery management systems are known safety devices used with lithium ion batteries for electrical charge/discharge and thermal management.

The battery case 100 is designed so each terminal post 181 of each cell 175 fits through terminal openings 166 of both trays 160, 170. Accordingly terminal posts 181 extend past vent plenum 172, into the BMS chamber 174 and finally into the BMS (not shown in the figures). Terminal openings 166 provide a pass-through design for electrical terminals 180 of each cell 175 to exit the enclosed cell compartment 154. O-ring seals are used at terminal openings 166 to prevent egress of electrolytes from the cell compartments 154. In a preferred embodiment, the terminal posts 181 have a tapered design that facilitates its entry into terminal openings 166 of both trays 160, 170.

External battery terminal 196a, 196b sit on the cover 110 and fit through holes to connect to the BMS. The BMS board may use connectors such as and not limited to RADSOK® type connectors, made by Amphenol Industrial Operations of Sydney, N.Y. Connectors are used to improve contact design of the external terminals 196a, 196b to the BMS. The RADSOK® connector may be attached to a top face of the BMS by spring clips. Spring clips provide the RADSOK® connector with a degree of movement to enable the external battery terminal 196a, 196b to better connect with the BMS. In an alternative embodiment, springs may be disposed on four corners of a bottom face of the BMS to also better enable the terminals 180 to connect with the BMS.

The battery case 100 of the present invention is especially designed to address contamination issues unique to monoblock lithium ion batteries. Means for containing and restraining undesirable contamination effects is accomplished by case construction, cell configuration and gas and liquid management. Accordingly, the case 100 incorporates features to prevent swelling, allow venting and manage gas and liquid pressures that arise under certain conditions of contamination.

Anti-swelling features employed with the case 100 provide a means to maintain the structural integrity, size and shape of the case 100. Internal and/or external anti-swelling features may be used with the case 100. The anti-swelling features withstand swelling of the anode/cathode plates as well as resist gas pressures created during charging. Non-limiting example of an internal anti-swelling features employed herein includes pads or backing plates 184. Non-limiting examples of external anti-swelling features include endplates 120 and the walls, the sides 144 and the ends 142, of the base 150.

Internal anti-swelling features used in the present invention include closed cell pads or plates 184. The pads may be made of polypropylene and the plates 184 may be made of fiberglass or metal such as aluminum. The pads and/or plates may be used between the cell 175 and the compartment walls 152 either alone or with other devices. For instance, the figures show the spring 188 and the plate 184 compressing the cell stack 176 and stiffening the case 100. However, any combination of internal anti-swelling components may be used in the present invention.

In another embodiment, alternate internal anti-swelling features may be realized by designing the compartment walls 152 with some degree of flexure. Flexible compartment walls 152 transmit and deflect force both to and from the spring 188. Flexible compartment walls 152 also accommodate thickness variations in cell 175 by compressing the cell stack 176 in adjacent compartments 154.

The walls of the case 100 and endplates 120 are suitable examples of external anti-swelling features employed with case 100. Both the sides 144 and the ends 142 of the base 150 are designed to withstand pressures generated from within the battery 100. Endplates 120 buttress the cell compartments 154 to prevent swelling and increase the stiffness of the end walls 142 of the case 100. The endplates 120 are inserted in retaining features on the external end 142 walls of the battery 100 and are parallel to the cell 175. See FIGS. 1 and 2. These retaining features can be passive features of the molded case, or can be actively attached to the case before, during, or after insertion of the structural endplates 120. FIG. 2 shows grooves on inner face of endplate 120, which correspond to tabs 162, 164 on trays 160, 170 and tabs on lid 110 and base 150.

In some embodiments, the endplates 120 may incorporate a compression feature similar to that described with springs 188. For instance, the endplate 120 may have a preformed curvature that must be flattened prior to insertion into retaining features on the external end 142. The curved endplates 120 are designed so that the flattening of the curved endplate does not exceed the yield strength of the structural endplate material. Accordingly, the curved endplates 120 function as a preloaded spring with reaction forces applied along its opposing vertical edges that are sustained by the end walls 142 of the case 100. In other embodiments, endplates 120 may be parallel to and may be insert-molded into the sides 144 of the case 100. The endplates 120 may be made from aluminum or other structural material suitable to increase stiffness of the end walls 142. Similar to the spring 188, endplates 120 are plated, coated, encapsulated, insert molded, or otherwise protected from electrolyte attack. The use of the aluminum endplates 120 forgoes the need to use straps, screws, etc in assembling the case 100.

Another external anti-swelling feature employed with the case 100 is a waffle iron pattern or a honeycomb pattern used with the walls of the case 100. The waffle pattern may be molded into the case 100 to increase stiffness. The pattern may be disposed in end 142 walls, but in certain embodiments, may be incorporated into other parts of the case 100. The waffle pattern may vary in grid size and depth, but in some cases may be thin. A stiffening skin such as a thin plastic sheet may be bonded or otherwise attached to the outside of the waffle pattern to increase the stiffness of the waffle pattern. The waffle pattern may be used with or without the aluminum endplates 120 and forgoes the need for straps, screws, etc in assembling the case 100.

Other safety features employed with the case 100 relate to venting and/or containing gas and liquid pressures. For instance, case 100 employs a pressure, liquid and gas management system to collect generated gas and entrained or displaced electrolytes during initial filling, abnormal charging/discharging or overheating. The pressure, liquid and gas management system mitigates increases in pressure due to gas generation and layer swelling by accumulating gas at atmospheric pressure. Non-limiting examples of pressure, liquid and gas management mechanisms of the present invention include vent plenum 172, check valve 178, bladders, bags, pads, etc. Many of these mechanisms serve dual purposes in restraining and/or containing electrolytes and gases.

In one embodiment the vent plenum 172 serves as an internal gas reservoir used to contain and/or restrain undesirable gas pressures generated from cells 175. The generated gas is fed into the vent plenum 172 by the check valve 178. The check valve 178 enables one-way outgassing of each cell 175, collection and trapping of outgassed gasses and emergency venting of the battery cells to prevent bursting. In another embodiment, the vent plenum 172 may serve the dual purpose of being an internal electrolyte reservoir by capturing entrained electrolytes in the event of seal failure from any of the cell compartments 154. Other non-limiting means to enable one-way outgassing of each cell includes using absorptive pads and one-way check valves.

In another embodiment, the pressure, liquid and gas management system may use a collapsible bladder or gas reservoir mentioned above. The bladder or reservoir absorbs gasses and liquids collected during fabrication and formation of the battery. The bladder may be removably joined to the battery 100. Thus, after being filled with collected gas, the bladder may be closed via an emergency valve and removed. In an alternative embodiment, the volume of the bladder intended to collect gas might be distinct and separate from the volume of the bladder intended to capture electrolyte. The bladder may contain electrolyte absorbing material or gas converting material.

In yet another embodiment, an edge-sealed bag may be used to manage and contain liquid and gas pressures. The bag may be fabricated of a flexible polymer, metallic or composite material that is resistant to electrolyte degradation. The bag may be collapsible to a zero-volume (flattened) state. The bag may be empty of gas and have a check valve 178 opening for inlet of gas and liquid material from each cell 175. At least one opening may communicate with a pressure relief valve (not shown) that vents to the external environment. The bag may also act as a fill reservoir that expands to fill with a designed volume of gas at substantially atmospheric pressure. The bag may be disposed within the vent plenum 172, adjacent the BMS chamber 174 or another suitable location. In some embodiments, the bag may contain a material that captures electrolyte liquid and/or generated gases and gas converting material.

With respect to liquid management, the case 100 provides means to restrain fluid ingress and egress. Ingress of water or absorption of water by the case material is detrimental to the Li cell chemistry. Likewise, egress of electrolytes from and regular fluid communication between cell compartments 154 are undesirable. Fluid communication between lithium cells can degrade electrolytes due to high potentials. Thus, hermeticity and non-permeability of the case is required to prevent both outward leaking of electrolyte and inward intrusion of water.

Hermeticity of the case 100 is achieved by using mechanisms to seal and methods of sealing. Seals prevent both ingress of water into case 100 and egress of electrolytes from cell compartments 154. O-rings are a type of sealing mechanism used to prevent electrolyte egress at all design pressures and fluid communication between cell compartments 154. The o-rings are disposed at the terminal openings 166 to isolate electrolytes within cell compartments 154. Alignment of the cells 175 with the terminal openings 166 also create good seal at terminal openings 166 to prevent electrolyte egress. In other embodiments, a diaper-like material is used for liquid management. The diaper-like material may be placed in the vent plenum 172 to soak up liquids. The diaper could be made of hard glass matter, or of material that converts liquid into a gel to prevent liquid movement.

The hermetic case 100 is further realized by molding, sealing and assembling architecture of the case 100 such that the electrolyte within each cell compartment 154 is isolated and water ingress from the environment is prevented. In a preferred method, a melt bond or weld is used to seal components or parts of the case 100. Good seals may be attained by using plastic for all parts of the case 100 or at all sealable joints. Here the plastic may be melted so as to weld the plastic into one continuous layer of plastic and hermetically seal the case 100. One method of sealing the case 100 disposes a hot metal block between adjoining plastic parts and melts the parts together.

For example, a plastic tray 170 and a plastic base 150 are separated at a distance and the hot metal block is disposed between the two parts. The hot metal block conforms to the shape of both the bottom surface of the tray 170 and the top edge of the base 150. The block radiates heat from a distance and by directly contacting the two plastic pieces. When both pieces absorb sufficient heat and are malleable, the hot metal tool is removed and the tray 170 and the base 150 are joined together welding the pieces into one continuous layer of plastic as described above. For practical use, joints of the case 100 would be oriented so edges are visible for inspection to test pressures and hermetic seals. In ideal situations, the present invention would be made to minimize the number and length of seal perimeters and would locate seals above the surface level of electrolytes.

Pressure, liquid and gas management may further be accomplished by absorbing or chemically converting gasses and liquids to another form. For example, captured carbon dioxide gas may be scrubbed using calcium hydroxide (soda lime) to convert the gas to chalk (calcium carbonate) and thereby increase the amount of gas absorbed. In should be noted that in situations when the pressure, liquid and gas management system is overwhelmed an emergency vent may be used to discharge collected gases, liquid and pressure and thus avoid bursting the battery case 100.

In another embodiment, fluid ingress or egress into the case 100 may be prevented by using non-wetted and non-conductive material to make the case 100. Suitable material used to make the case 100 will not absorb water or allow moisture to pass through. The case 100 may be made of water impermeable material including a range of plastics, for example polypropylenes that have any thickness and any number of layers. For instance, a variety of plastics may be used wherein different layers are employed for different purposes. One plastic may be used for strength, another to block water, another capable of withstanding a range of temperatures, etc. In one example, the case 100 may be made of composite material such as plastic, a fiberglass filler and a dye for laser marking and product recognition.

In yet another embodiment, a water impermeable coating may be applied externally and internally to the case 100 to provide a hermetic and water-resistant case 100. Examples of water impermeable coatings include metals, which are ideal moisture barriers. Suitable metals include aluminum, nickel, copper, etc. The metals may further be coated with a protectant layer such as a plastic layer or a glass layer, etc. to serve as a defensive layer from electrolytes. The coating should not be wetted by electrolytes and should prevent capillary communication of electrolytes between separate cell compartments 154.

The battery case 100 of the present invention may be used for a variety of purposes. For example, the battery case 100 may be used in military vehicles that drive on rough terrain and encounter rough terrain. The components of the battery case 100 are secured to prevent shifting or damage during shock, vibration, charging and temperature cycling. Such means include and are not limited to encapsulating, potting, and use of springs, damping pads, rigid mount points, buttress plates, tapes and low friction pads. The case 100 is designed to absorb shock and vibration without cracking and to withstand internal and external pressures.

While the invention has been described by way of example and in terms of specific embodiments it is not so limited and is intended to cover various modifications as would be apparent to those skilled in this art area. Therefore, the scope of the appended claims should be accorded the broadest interpretation so as to encompass all such modifications.

The invention claimed is:

1. A monoblock lithium ion battery comprising:
    a base with an open top, the base having two ends joined to two sides with a bottom connected to the two ends and the two sides, the base having compartment walls defining cell compartments, the cell compartments defining a chamber, the cell compartments receiving a plurality of lithium ion cells, the plurality of lithium ion cells having terminals;
    a first tray, the first tray dimensioned and configured to seal the chamber, the first tray having terminal openings and vent openings, the vent openings having check valves to permit one-way movement for gas or liquid from the chamber;
    a second tray, the second tray dimensioned and configured to the first tray, the second tray and the first tray forming a plenum, the second tray having terminal openings;
    a spring used to hold each of the plurality of lithium ion cells, the spring applying uniform compression on each of the plurality of lithium ion cells; and
    a cover dimensioned and configured to seal the open top of the base, the cover being disposed over the second tray to form a second chamber, wherein terminals of the plurality of lithium ion cells extend into the plenum between the first tray and the second tray and extend into the second chamber between the second tray and the cover, wherein gas produced by the plurality of lithium ion cells is vented into the plenum.

2. The battery of claim 1, further comprising endplates disposed at the ends, the endplates buttressing the battery.

3. The battery of claim 1, wherein each spring encompasses a perimeter of a respective one of the plurality of cells.

4. The battery of claim 1, wherein each spring has a curvature providing compression on a respective one of the plurality of cells.

5. The battery of claim 1, wherein the spring comprises a leaf spring.

6. The battery of claim 1, wherein the cover has external battery terminals extending therefrom, and wherein the battery further comprises a battery management system located in the second chamber, the terminals of the plurality of lithium ion cells extending into the battery management system and the external battery terminals being connected to the battery management system.

7. The battery of claim 1, further comprising endplates disposed at the ends, the endplates having a curvature providing compression on the battery.

8. The battery of claim 1, wherein at least the ends of the base uses a waffle pattern to maintain and provide structural integrity to the battery.

* * * * *